United States Patent
Kanade et al.

(10) Patent No.: US 7,027,083 B2
(45) Date of Patent: Apr. 11, 2006

(54) SYSTEM AND METHOD FOR SERVOING ON A MOVING FIXATION POINT WITHIN A DYNAMIC SCENE

(75) Inventors: Takeo Kanade, Pittsburgh, PA (US); Robert Collins, Pittsburgh, PA (US); Omead Amidi, Pittsburgh, PA (US); Ryan Miller, Canonsburg, PA (US); Wei Hua, Santa Clara, CA (US)

(73) Assignee: Carnegie Mellon University, Pittsburgh, PA (US)

( * ) Notice: Subject to any disclaimer, the term of this patent is extended or adjusted under 35 U.S.C. 154(b) by 471 days.

(21) Appl. No.: 10/074,314

(22) Filed: Feb. 12, 2002

(65) Prior Publication Data
US 2002/0118286 A1    Aug. 29, 2002

Related U.S. Application Data

(60) Provisional application No. 60/268,204, filed on Feb. 12, 2001.

(51) Int. Cl.
*H04N 7/18* (2006.01)

(52) U.S. Cl. .................................................. 348/159

(58) Field of Classification Search ................ 348/143, 348/222, 211.9, 169, 170, 142, 171, 172; 382/103, 154, 23
See application file for complete search history.

(56) References Cited

U.S. PATENT DOCUMENTS 5,164,827 A * 11/1992 Paff .............................. 348/143

(Continued)

FOREIGN PATENT DOCUMENTS

EP    0 529 317 A1    3/1993

(Continued)

OTHER PUBLICATIONS

Kanade, T. et al.: "Virtualized Reality: Constructing Virtual Worlds From Real Scenes" IEEE Multimedia, Jan-Mar 1997, IEEE, USA, vol. 4, No. 1, pp. 34-47.

(Continued)

*Primary Examiner*—Vu Le
*Assistant Examiner*—Behrooz Senfi
(74) *Attorney, Agent, or Firm*—Kirkpatrick & Lockhart Nicholson Graham LLP (57) ABSTRACT

A system and method for servoing on a moving target within a dynamic scene. According to one embodiment, the system includes a master variable pointing camera system and a plurality of slave variable pointing camera systems positioned around the scene. The system also includes a master control unit in communication with the master variable pointing camera system. The master control unit is for determining, based on parameters of the master variable pointing camera system, parameters for each of the slave variable pointing camera systems such that, at a point in time, the master variable pointing camera system and the slave variable pointing camera systems are aimed at the target and a size of the target in an image from each of the master variable pointing camera system and the slave variable pointing camera systems is substantially the same. The system also includes a plurality of slave camera control units in communication with the master control unit. The slave camera control units are for controlling at least one of the slave variable pointing camera systems based on the parameters for each of the slave variable pointing camera systems. The system may also include a video image sequence generator in communication with the master control unit and the slave camera control units. The video image sequence generator may generate a video image sequence of the target by outputting an image from certain of the master variable pointing camera system and the slave variable pointing camera systems in sequence according to the position of the master variable pointing camera system and the slave variable pointing camera systems around the scene.

19 Claims, 5 Drawing Sheets

U.S. PATENT DOCUMENTS

| | | | |
|---|---|---|---|
| 5,489,886 | A | 2/1996 | Wexler et al. |
| 5,714,997 | A | 2/1998 | Anderson |
| 5,745,126 | A * | 4/1998 | Jain et al. .................... 382/154 |
| 5,912,700 | A | 6/1999 | Honey et al. |
| 5,917,937 | A | 6/1999 | Szeliski et al. |
| 6,005,610 | A * | 12/1999 | Pingali ....................... 348/169 |
| 6,084,979 | A | 7/2000 | Kanade et al. |
| 6,094,198 | A | 7/2000 | Shashua |
| 6,100,925 | A | 8/2000 | Rosser et al. |
| 6,137,491 | A | 10/2000 | Szeliski |
| 6,144,375 | A * | 11/2000 | Jain et al. .................... 382/154 |
| 6,157,747 | A | 12/2000 | Szeliski et al. |
| 6,259,853 | B1 | 7/2001 | Chen et al. |
| 6,608,923 | B1 | 8/2003 | Zhang et al. |
| 2001/0028399 | A1 | 10/2001 | Conley |
| 2001/0052131 | A1* | 12/2001 | Hobson et al. ............. 725/105 |
| 2002/0030741 | A1* | 3/2002 | Broemmelsiek ............ 348/169 |
| 2002/0118969 | A1 | 8/2002 | Kanade et al. |
| 2002/0145660 | A1 | 10/2002 | Kanade et al. |
| 2003/0076413 | A1 | 4/2003 | Kanade et al. |
| 2003/0210329 | A1 | 11/2003 | Aagaard et al. |

FOREIGN PATENT DOCUMENTS

| | | |
|---|---|---|
| WO | WO 99 52288 A | 10/1999 |
| WO | WO 02/11431 A1 | 2/2002 |
| WO | WO 02 087218 A | 10/2002 |
| WO | WO 02 096096 A | 11/2002 |

OTHER PUBLICATIONS

Narayanan, PJ et al.: "Constructing Virtual Worlds Using Dense Stereo" 6th International Conference On Computer Vision. ICCV '98. Bombay, Jan. 4-7, 1998, IEEE International Conference On Computer Vision, New York, NY: IEEE, US, 1998, pp. 3-10.

Tsai R Y: "A Versatile Camera Calibration Technique For High-Accuracy 3D Machine Vision Metrology Using Off-The-Shelf TV Cameras and Lenses," IEEE Journal of Robotics and Automation, IEEE Inc. New York, US, vol. RA-3, No. 4, Aug. 1987, pp. 323-344.

Vedula S et al.: "Modeling, combining and rendering dynamic real-world events from image sequences," VSMM98. 4th International Conference On Virtual Systems and Multimedia, 1998, pp. 326-332.

Spice, Byron: "CMU experts helping CBS's 30 robotic cameras to work as one", Pittsburgh Post-Gazette, Jan. 24, 2001, Pittsburgh, PA, USA.

Grotticelli, Michael: "CBS Sports eyes Final Four", Broadcasting & Cable, No. 13, Mar. 26, 2001, North Hollywood, CA, USA. (www.broadcastingcable.com/index.asp?layout=print_page&articleID=CA67817)

Saito, H., et al.: "Appearance-Based Virtual View Generation of Temporally-Varying Events from Multi-Camera Images in the 3D Room", 3-D Digital Imaging & Modeling, 1999 Proceedings. Second International Conference in Ottawa, Ont., Canada. Oct. 4-8, 1999, Los Alamitos, CA, USA. IEEE COMPUT. SOC, US. Oct. 4, 1999, pp. 516-525.

* cited by examiner

SYSTEM AND METHOD FOR SERVOING ON A MOVING FIXATION POINT WITHIN A DYNAMIC SCENE

CROSS-REFERENCE TO RELATED APPLICATIONS

This application claims priority under 35 U.S.C. §119 to U.S. provisional patent application Serial No. 60/268,204, filed Feb. 12, 2001, which is incorporated herein by reference.

BACKGROUND OF THE INVENTION

1. Field of the Invention

The present invention relates generally to image and video processing.

2. Description of the Background

One example of a visual special effect is to play back frames from the same time, as seen from a sequence of cameras laid along some trajectory in the scene. This effect is sometimes referred to as the "3D stop-motion" effect. When the images are from the same instant in time, the effect is also sometimes called the "3D stop-motion" effect.

In current practice, the cameras focus on a single, spatial location. Thus, such systems are not ideal when the point of interest is moving.

BRIEF SUMMARY OF THE INVENTION

In one general respect, the present invention is directed a system for servoing on a moving target within a dynamic scene. According to one embodiment, the system includes a master variable pointing camera system and a plurality of slave variable pointing camera systems positioned around the scene. The system also includes a master control unit in communication with the master variable pointing camera system. The master control unit is for determining, based on parameters of the master variable pointing camera system, parameters for each of the slave variable pointing camera systems such that, at a point in time, the master variable pointing camera system and the slave variable pointing camera systems are aimed at the target and a size of the target in an image from each of the master variable pointing camera system and the slave variable pointing camera systems is substantially the same. The system also includes a plurality of slave camera control units in communication with the master control unit. The slave camera control units are for controlling at least one of the slave variable pointing camera systems based on the parameters for each of the slave variable pointing camera systems.

According to another embodiment, the system may include a plurality of variable pointing camera systems positioned around the scene with a master control unit in communication with a first of the variable pointing camera systems. The master control unit is for determining, based on parameters of the first variable pointing camera system, parameters for at least a second variable pointing camera system such that, at a point in time, the first and second variable pointing camera systems are aimed at the target and a size of the target in an image from the first and second variable pointing camera systems is substantially the same. The system also includes a slave camera control unit in communication with the master control unit for controlling the second variable pointing camera system based on the parameters for the second variable pointing camera system. The system may also include a video image sequence generator in communication with the master control unit and the slave camera control units. The video image sequence generator may generate a video image sequence of the target by outputting an image from certain of the master variable pointing camera system and the slave variable pointing camera systems in sequence according to the position of the master variable pointing camera system and the slave variable pointing camera systems around the scene. The images may be, fore example, all from the same instant in time.

According to another embodiment, the system includes a master variable pointing camera system and a plurality of slave variable pointing camera systems. The slave variable pointing camera systems and the master variable pointing camera system are positioned around the scene. The system further includes means for determining, based on parameters of the master variable pointing camera system, parameters for each of the slave variable pointing camera systems such that, at a point in time, the master variable pointing camera system and the slave variable pointing camera systems are aimed at the target and a size of the target in an image from each of the master variable pointing camera system and the slave variable pointing camera systems is substantially the same. The system also includes means for controlling the slave variable pointing camera systems based on the parameters for each of the slave variable pointing camera systems. The system may also include means for generating a video image sequence of the target by outputting an image from certain of the camera systems in order according to the positioning of the corresponding camera systems around the scene.

In another general respect, the present invention is directed to method for servoing on a moving target within a dynamic scene. According to one embodiment, the method includes reading parameters of a first variable pointing camera system and determining parameters for a plurality of other variable pointing camera systems. The first variable pointing camera system and the plurality of other variable pointing camera systems are positioned around the scene. The parameters for the plurality of other variable pointing camera systems are determined based on the parameters of the first variable pointing camera system such that, at a point in time, each of the variable pointing camera systems are aimed at the target and a size of the target in an image from each of the variable pointing camera systems is substantially the same. The method further includes controlling the plurality of other variable pointing camera systems based on the parameters for the plurality of other variable pointing camera systems. According to another embodiment, the method may further include storing digitized, time-stamped images from the master variable pointing camera system and the slave variable pointing camera systems, and generating a video image sequence of the target by outputting an image from certain of the master variable pointing camera system and the slave variable pointing camera systems in sequence according to the position of the master variable pointing camera system and the slave variable pointing camera systems around the scene. The images may be, for example, from the same instant in time.

DESCRIPTION OF THE FIGURES

Embodiments of the present invention are described in conjunction with the following figures, wherein.

DETAILED DESCRIPTION OF THE INVENTION

It is to be understood that the figures and descriptions of the following embodiments have been simplified to illustrate elements that are relevant for a clear understanding of the present invention, while eliminating, for purposes of clarity, other elements. For example, certain operating system details and modules of computer processing devices are not described herein. Those of ordinary skill in the art will recognize, however, that these and other elements may be desirable in a typical image processing system. However, because such elements are well known in the art, and because they do not facilitate a better understanding of the present invention, a discussion of such elements is not provided herein.

Figure 1:
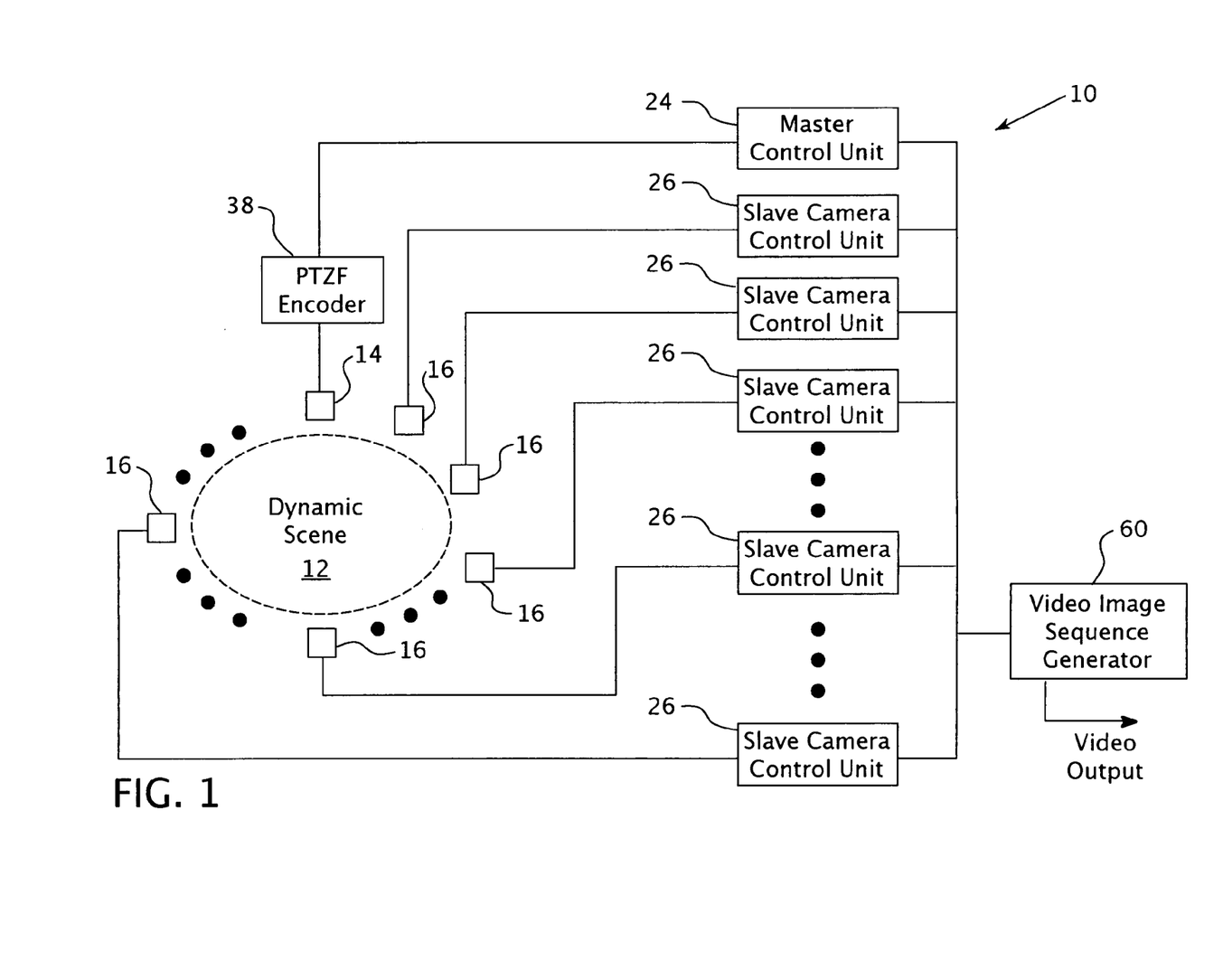
FIGS. 1 and 2 are block diagrams of the system of the present invention according to one embodiment.
Figure 2:
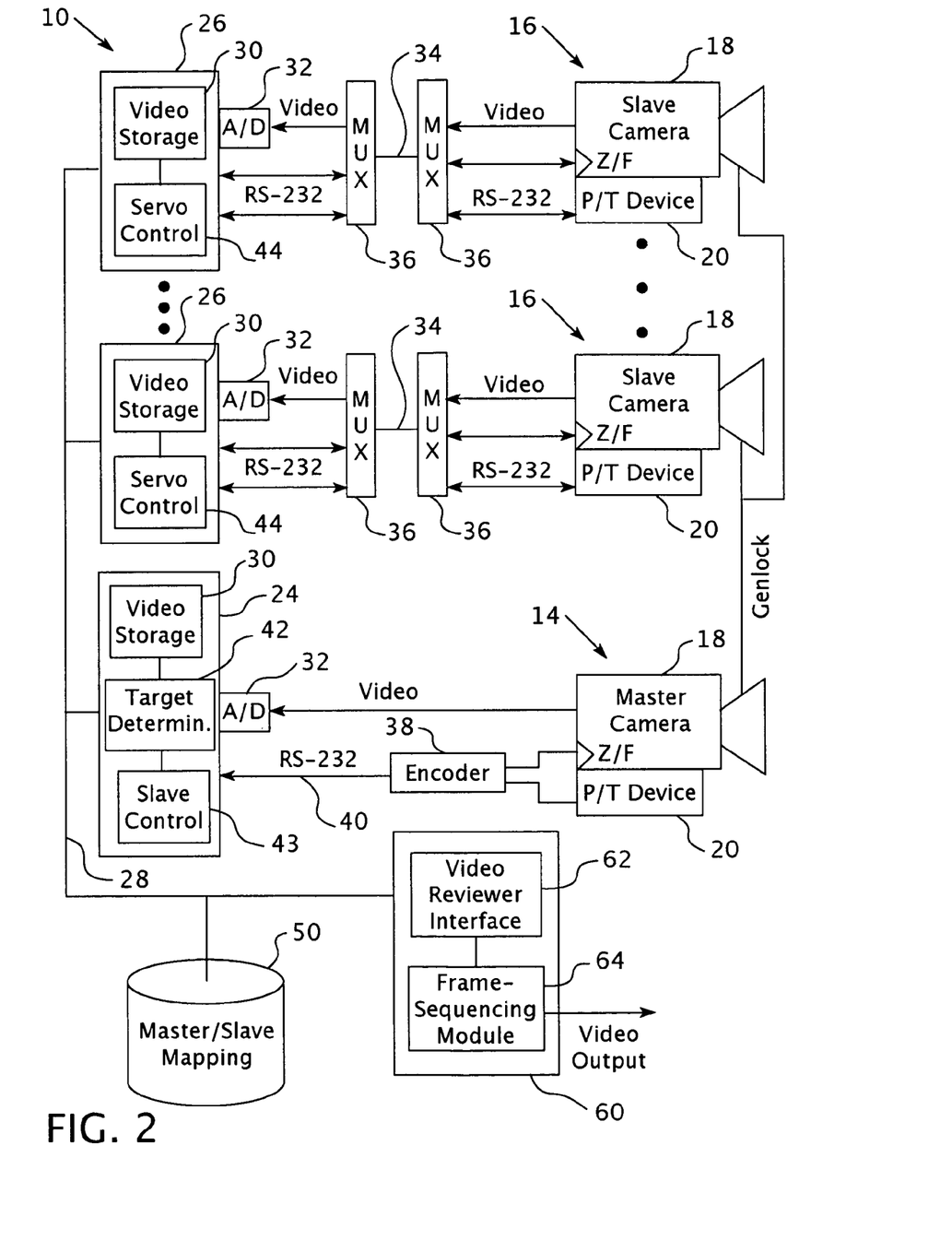

According to one embodiment, the present invention is directed to a system for servoing on a moving target within a dynamic scene. FIGS. 1 and 2 are block diagrams of the system 10 according to one embodiment. The system 10 includes a number of variable pointing camera systems positioned around the dynamic scene 12. The camera systems may include a master variable pointing camera system 14 and a number of slave variable pointing camera systems 16. According to one embodiment, the variable pointing camera systems 14, 16 may be, for example, pan/tilt camera systems, as explained further herein. For purposes of convenience, the camera systems 14, 16 are referred to hereinafter as "pan/tilt" camera systems, although it should be recognized that the variable pointing camera systems 14, 16 may be any camera system having the ability to point at different targets within the scene 12.

The master pan/tilt camera system 14 may include a video camera 18 and a pan/tilt device 20 for panning and tilting the camera 18. Similarly, the slave pan/tilt camera systems 16 may include a video camera 18 and pan/tilt devices 20. The system 10 may include any number of camera systems 14, 16 positioned around the scene, and the quantity may be determined upon the system requirements and applications. According to one embodiment, the camera systems 14, 16 are equally spaced about the scene 12.

As illustrated in FIGS. 1 and 2, the system 10 additionally includes a master control unit 24 in communication with the master camera system 14. The system 10 also includes a number of slave camera control units 26 in communication with the master control unit 24 by, for example, a computer network 28 such as, for example, a LAN. Each slave camera control unit 26 is for controlling one or more slave camera systems 16. For purposes of simplicity, in FIGS. 1 and 2 each slave camera control unit 26 is shown as being in communication with only one slave camera system 16; however, according to other embodiments, more than one slave camera system 16 may be in communication one slave camera control unit 26 for the purpose of having that one slave camera control unit 26 control multiple slave camera systems 16.

The master control unit 24 and the slave camera control units 26 may be implemented as computing devices such as, for example, a personal computer, a laptop computer, a workstation, a minicomputer, a mainframe or a supercomputer, depending upon the application requirements. Each of the control units 24, 26 may include a video storage unit 30 for storing digitized, time-stamped video image frames from the respective camera systems 14, 16. The video storage units 30 may be such that the video image frames are retrievable both spatially (by camera) and/or temporally (by time). According to one embodiment, the video storage units 30 may be, for example, DAT drives utilizing a Digital Video Data Storage (DVDS) format. For an embodiment where the cameras 18 are not digital video cameras, the system 10 may include analog-to-digital (A/D) converters 32 to convert the analog video from the cameras 18 to a digital format.

The camera systems need not be in close proximity to their respective control units. For example, in FIG. 2 the slave camera systems 16 are shown as being in communication with their respective slave camera control units 26 via a fiber optic cable 34. For such an embodiment, the system 10 may include multiplexers/demultiplexers (MUX) 36 to multiplex and demultiplex the data onto and off of the fiber optic cables 34. In FIG. 2 the master camera system 14 is not illustrated as being in communication with the master control unit via a fiber optic cable, but according to other embodiments these components may be in communication via, for example, a fiber optic cable.

The master camera system 14 may be operated by an operator (not shown), which may be, for example, a human operator or a computer vision system, as described hereinafter. Accordingly, the operator may focus the master camera system 14 on the point of interest (or target) within the scene 12. Parameters of the master camera system 14 are communicated to the master control unit 24. According to one embodiment, the relevant parameters may include pointing parameters, such as pan (P) and tilt (T) angles for the pan/tilt devices 20, optical parameters, such as zoom (Z) and focus (F) parameters of the cameras 18, and mechanical parameters, such as speed and accuracy. These parameters may be digitally encoded by an encoder 38 and communicated to the master control unit 24, such as by using a RS232 link 40. For purposes of convenience for the description to follow, the relevant parameters will be limited to pan, tilt, zoom and focus, although it should be recognized that other parameters might also be used for the system 10. Also, hereinafter the encoder 38 is sometimes referred to as the PTZF encoder 38.

As illustrated in FIG. 2, the master control unit 24 may also include a target determination module 42 and a slave control module 43. The modules 42, 43 may be implemented as software code to be executed by the master control unit 24 using any suitable computer language such as, for example, Java, C or C++ using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

The target determination module 42 reads the current PTZF parameters received from the master camera system 14. Based on the pan/tilt angles, the target determination module 42 may compute the position of the desired target within the scene 12, and based on the zoom and focus parameters the target determination 42 may compute the size of the target at the position in images from the master camera system 14.

Based on the determined target position and size, the slave control module 43 may compute the desired pan, tilt, zoom and focus parameters for each slave camera system 16. As described further hereinbelow, this calculation may also be dependent on master/slave mapping data, which may be ascertained during a calibration process. The master/slave mapping data may be stored in a network database 50, as illustrated in FIG. 2. According to another embodiment, the master/slave mapping data may be stored in a memory unit (not shown) of the master control unit 24. Once computed by the slave control module 42, the parameters are communicated, via the network 28, to the slave camera control units 26 that control the slave camera systems 16. Commands may be sent from the master control unit 24 to each slave camera control unit 26 at a high update rate in order to be responsive to movements made by the operator of the master camera system 14.

Also, as illustrated in FIG. 2, each slave camera control unit 26 includes a servo control module 44. The servo control modules 44 may be implemented as software code to be executed by the slave camera control units 26 using any suitable computer language such as, for example, Java, C or C++ using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

Based on the PTZF parameters received from the slave control unit 43, the servo control modules 44 execute a servo control loop to compute commands to control the pan, tilt, zoom and focus of the slave camera systems 16 in order that the slave camera systems 16 may track the same target as the master camera system 14 and with the same focus to smoothly and accurately track the scene position designated by the master camera system 14. The PTZF commands for the slave camera systems 16 may be communicated from the slave camera control units 26 via, for example, the fiber optic cable 34 and RS-232 links. The pan and tilt commands may be input to the pan/tilt device 20 of the slave camera system 16 and the zoom/focus commands may be input to the camera 18 of the slave camera system 16.

Thus, according to one embodiment, based on feedback from the master camera system 14 and knowledge of the geometry of the scene, a 3D servo-fixation point may be chosen, which is the desired target of each camera system 14, 16. Each slave camera system 16 is then directed to view this fixation point. As the operator moves the master camera system 14 in real-time, each slave camera system 16 is controlled to continuously servo on the moving fixation point. The zoom and focus of each slave camera system 16 is also controlled, based on their distance to the desired servo-fixation point.

Also, as illustrated in FIGS. 1 and 2, the system 10 may include a video image sequence generator 60 which may, according to one embodiment, be implemented by a computing device such as, for example, a personal computer, a laptop computer, a workstation, a minicomputer, a mainframe or a supercomputer, depending upon the application requirements. The video image sequence generator 60 may include a video reviewer interface module 62 and a frame-sequencing module 64. The modules 62, 64 may be implemented as software code to be executed by the generator 60 using any suitable computer language such as, for example, Java, C or C++ using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

Video from the master and slave camera systems may be continuously stored in the video storage units 30. The video reviewer interface module 62 may be a graphic-based man-machine interface that provides continuous video from at least one of the camera systems 14, 16 to a video review operator and which allows the video review operator to select parameters to create a video image sequence of the target such as, for example, the time for a 3D stop-motion image sequence, or the start and end times for a time-varying sequence. Also, the video review operator may designate which camera systems 14, 16 to use (i.e., all or less then all). The reviewer interface module 62 may also allow the reviewer to retrieve video frames temporally (i.e., sequential frames in time from a single camera system) and/or spatially (i.e., the same time frame, retrieved from a sequence of cameras). To generate a 3D stop-motion video image sequence, the video review operator may select the desired point in time (t) for when to generate the sequence. The frame sequencing module 64 may then retrieve the image frames for time t from the video storage units 30 for certain (i.e., all or less than all) of the camera systems 14, 16 and output the images in a sequence corresponding to the order of the placement of the corresponding camera systems 14, 16 around the scene 12, either clockwise or counterclockwise. According to one embodiment, each camera system 14, 16 may be synchronized to a common genlock signal so that the shutter for each camera 18 fires at precisely the same time, resulting in video frames taken at the same time instant, thus heightening the apparent stop-motion effect.

Figure 3:
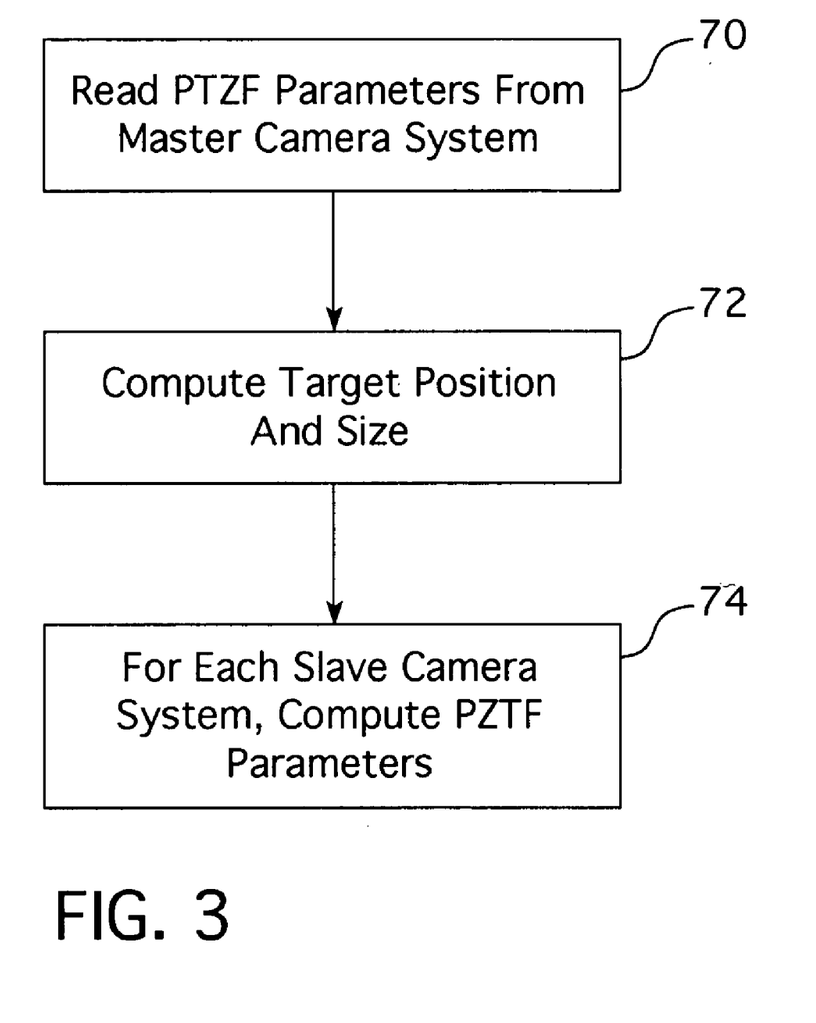
FIG. 3 is a diagram of the process flow through the master control unit of the system of FIGS. 1 and 2 according to one embodiment of the present invention.

FIG. 3 is a diagram illustrating the process flow through the master control unit 24 according to one embodiment of the present invention. The process initiates at block 70 where the master control unit 24 reads the pan, tilt, zoom and focus (PTZF) parameters of the master camera system 14. Next, at block 72, the target determination module 42 determines the position and size of the target. As described previously, the target determination module 42 may determine the position from the pan and tilt parameters and the size from the zoom and focus parameter. Next, at block 74, the slave control module 43 may compute the PTZF parameters for each of the slave camera systems 16 based on the determined target position and size, and based on the master/slave mapping data as determined in the calibration process.

Before operation of the system 10, each camera system 14, 16 may be calibrated so that its relationship to the scene 12 and to the other camera systems is known. According to one embodiment, this requires determining the pose (i.e., location and orientation) of each camera system 14, 16 with respect to a scene coordinate system, determining the relationship of the zoom control parameter to angular field of view, and determining the relationship of the focus control parameter to the distance of objects in the scene.

Camera pose may be determined by measuring the pan/tilt angles toward a set of distinguished points or "landmarks" with known 3D coordinates. "Sighting" the landmarks involves rotating the pan/tilt device from a user interface, until the landmark point is centered within the field of view of the camera. The pan/tilt parameters are the stored with the X,Y,Z coordinates of the landmark to form one pose calibration measurement.

Camera orientation and location can be determined by an optimization procedure, using three or more landmark measurements in a nondegenerate configuration. For high-precision pointing, it may also be necessary to measure the pitch and yaw of the sensor as mounted on the pan/tilt devices 20, and the offset of the sensor focal point from the center of rotation of the pan/tilt device 20. These values can be measured directly and/or solved for using an optimization procedure based on more than three landmark measurements.

Computer control of motorized zoom lenses may involve sending commands to the camera system containing parameters specifying the desired zoom and focus. The effect of the value of these parameters on physical lens settings may be determined through calibration. The zoom parameter may be calibrated by stepping through the allowable values and measuring the field of view after the motorized zoom is complete. User control of the pan/tilt devices 20 can be used to actively and directly measure the field of view at each setting.

The focus parameter may be calibrated by focusing on objects at different distances from the camera systems 14, 16, and deriving either an explicit or implicit relationship between focus value and distance. For example, an implicit relationship can be determined using a lookup table of focus parameter settings, indexed by inverse distance to the desired focal distance in the scene. Focus to points at intermediate distances can be determined via interpolation of these stored table values.

Accordingly, another embodiment of the present invention is directed to a method of calibrating the camera systems 14, 16. According to one embodiment, the method may include determining the geometric relationship of the camera systems 14, 16 to the scene 12, determining a relationship between camera zoom for each camera system 14, 16 and angular field of view, and determining a relationship between camera focus for each camera system 14, 16 and depth of field. As described previously, determining the geometric relationship of the camera systems 14, 16 to the scene 12 may include determining the pose (orientation and location) for each camera system 14, 16 by measuring, for each camera system 14, 16, the pointing angles, such as pan and tilt angles, for a plurality of landmarks (such as three or more) with known 3D coordinates. Determining the relationship between camera zoom for each camera system 14, 16 and angular field of view may include, as described previously, measuring the angular field of view for a plurality of zoom settings for each camera system 14, 16. In addition, determining the relationship between camera focus and depth of field may include, as described previously, focusing on a plurality of objects at different distances from the camera systems and determining the relationship, either explicitly or implicitly, between focus value and distance for each camera system.

During system operation, the operator may select any camera system in the system 10 to act as a master camera system 14. According to one embodiment, the operator may change which camera system is the master camera system 14 at any time.

Figure 4:
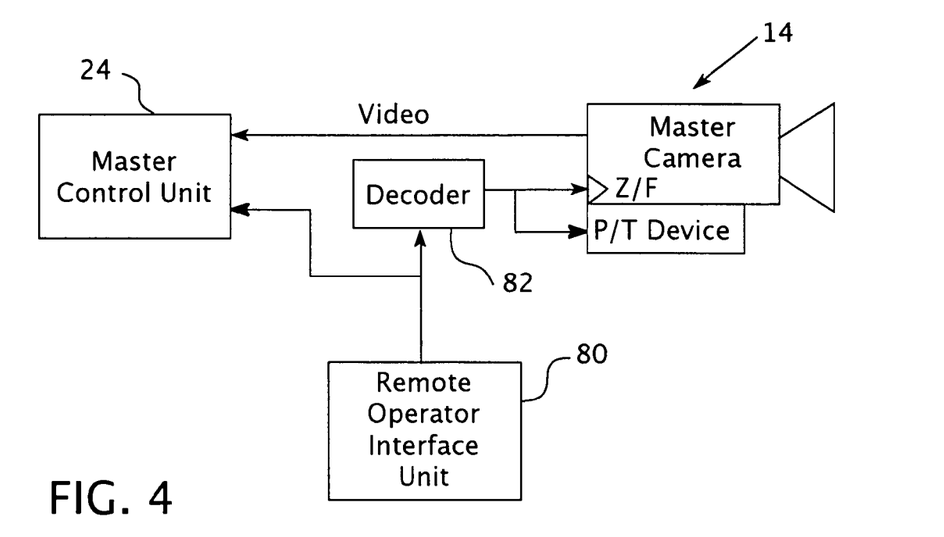
FIGS. 4 and 5 are diagrams of a portion of the system according to different embodiments.

For an embodiment in which the operator of the master camera system 14 is a human operator, i.e., a "cameraman," the cameraman may control the pan, tilt, zoom and focus of the master camera system 14 remotely through a remote operator interface unit 80, as illustrated in FIG. 4. The remote operator interface unit 80 may be implemented as a computing device such as, for example, a personal computer, a laptop computer or a workstation, providing a graphical user interface to allow the cameraman to specify the pan, tilt, zoom and focus parameter for the master camera system 14. A decoder 82 may decode these parameters for use by the master camera system 14. These parameters may also be input to the master control unit 24, either directly from the user interface, as illustrated in FIG. 4, or as feedback from the master camera system after it has executed a movement, as shown in FIG. 2.

Figure 5:
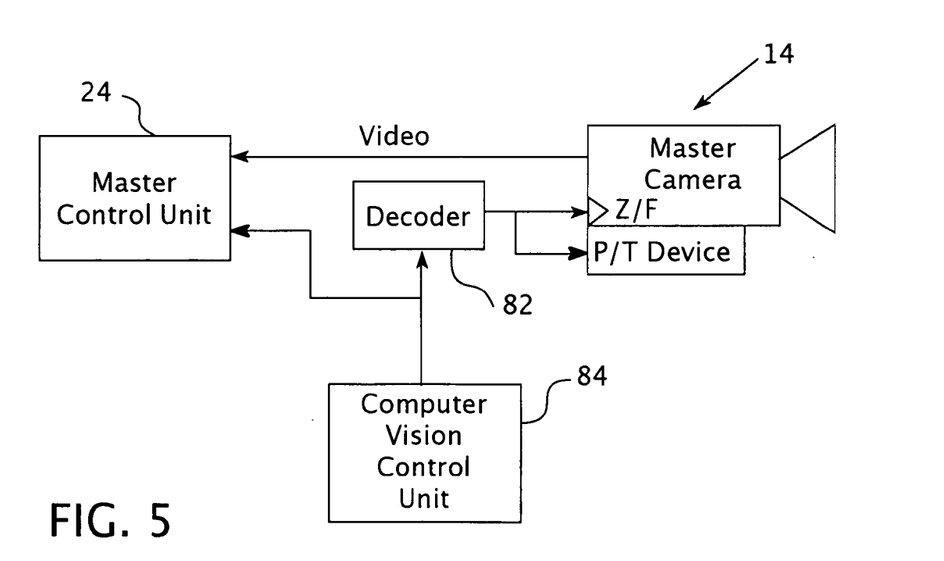

As described previously, the operator of the master camera system 14 may also be a computer vision application. FIG. 5 is a diagram of a portion of the system 10 according to such an embodiment. As illustrated in FIG. 5, the system 10 includes a computer vision control unit 84 for controlling the master camera system 14. The computer vision control unit 84 may be implemented as a computing device such as, for example, a personal computer, a laptop computer or a workstation, configured with computer vision software that when executed by the computer vision control unit automatically detects and tracks moving objects in the scene 12 by processing video from the master camera system 14. According to another embodiment, the computer vision control unit 84 may receive the video from and be in communication with each camera system 14, 16, and may automatically select a different camera system to be the master computer system to decrease the distance to, or increase the visibility of, an object being tracked by the computer vision control unit 84.

Figure 6:
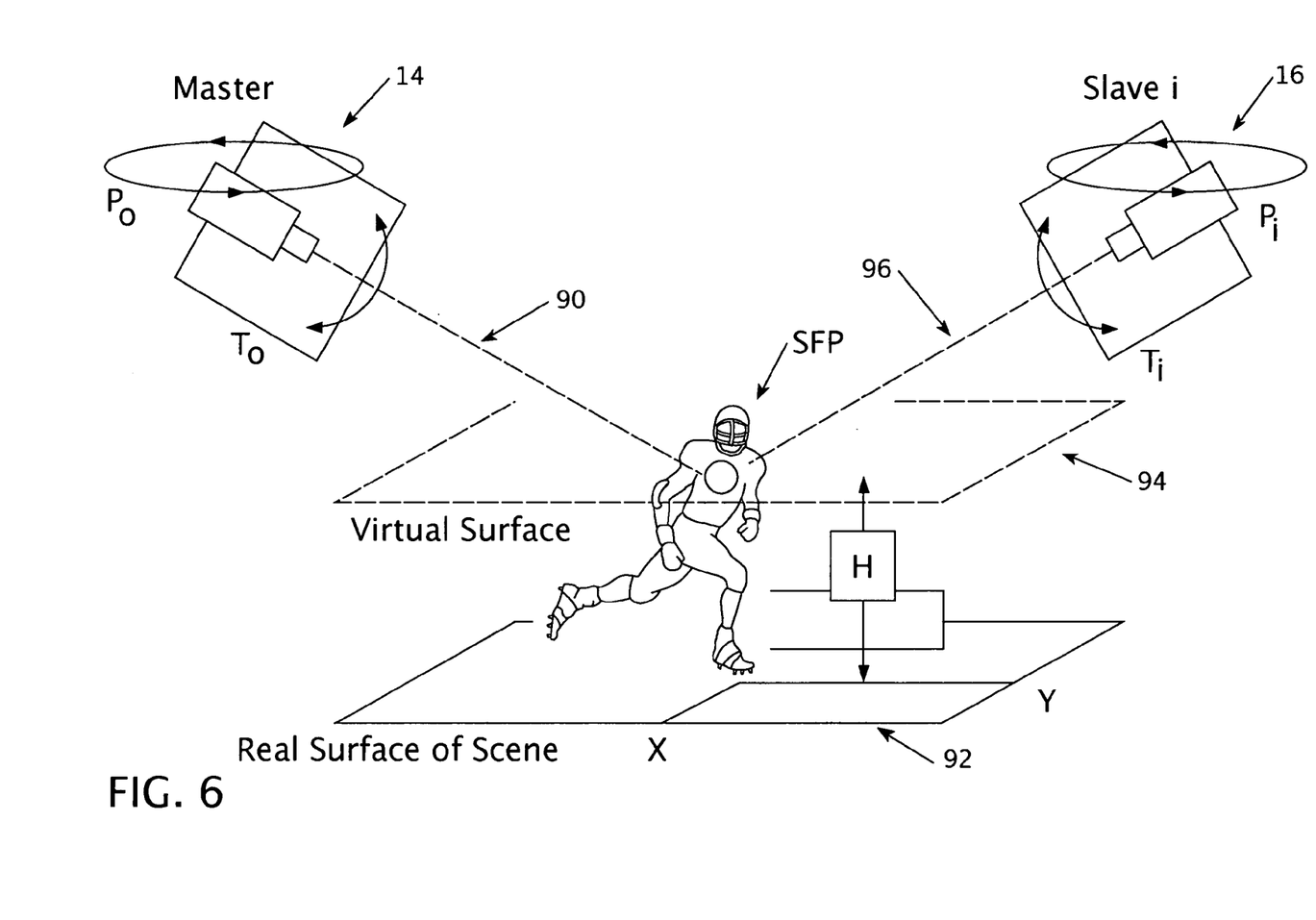
FIG. 6 is a diagram illustrating the relationship between the principal viewing ray of the master camera system and the servo fixation point (SFP) according to one embodiment.

With reference to FIG. 6, based on the pan/tilt angle parameters from the master camera system 14, the master control unit 24 may determine the equation of a 3D line specifying the principal-viewing ray 90 of the master camera system 14. All points on this line can be represented as $\vec{p} = \vec{c} + k\vec{v}$, where $\vec{p}$ is a 3D point on the line, $\vec{c}$ is the focal point of the master camera system, v is a unit vector representing the orientation of the principal axis, directed out from the focal point, and k is a scalar parameter that selects different points on the line. Only points on the line that are in front of the focal point (i.e., k>0) are considered to be on the master camera system principal viewing ray 90.

The desired servo-fixation point (SFP) for the spin-image effect is defined to be some point on the principal viewing ray 90 of the master camera system 14. Choosing which point is the SFP is equivalent to choosing a value for parameter k in the above line equation. The SFP may be determined by specifying k directly through a user interface such as, for example, the video reviewer interface 62 or the remote operator interface unit 80. Note that k represents the distance or range of the desired SFP from the master camera system 14. It may be selected using a one-degree of freedom mechanism, by the cameraman or a second operator. According to one embodiment, the SFP may be determined by intersecting the principal-viewing ray 90 with an equation or set of equations representing a real surface of the scene 92. For example, the real surface of the scene 92 may be approximately represented by the equation of a plane. Alternatively, a more accurate approximation may be to represent the field by a nonplanar, triangulated mesh, or an explicit nonplanar surface equation.

Similarly, the SFP may be determined by intersecting the principal-viewing ray 90 with an equation or set of equations representing a virtual (nonphysical) surface 94 in the scene. For example, it may be desirable to intersect the viewing ray 90 with a virtual surface 94 located a certain distance H, e.g. four feet, above the real surface of the scene 92. According to another embodiment, the SFP may be determined by intersecting the principal-viewing ray 90 with a set composed of any arbitrary combination real and virtual surfaces in the scene, for example the floor, walls and ceiling of a room.

If the SFP is determined by intersecting the principal-viewing ray 90 with a surface or set of surfaces. Because there is more than one mathematical intersection point, various methods may be used to determine which point is the desired SFP. One such method is to always choose the intersection point that is closest to the master camera system 14. If there is no mathematical intersection point, an alternate method must be used to determine the SFP. One example is to use the last known valid point of intersection.

For each slave camera system, the 3D position of the SFP is used to compute the pan and tilt angle parameters that bring the slave camera system principal-viewing ray 96 into alignment with the SFP. These values are used to command the pan/tilt device 20 of the respective slave camera systems 16 to move. After this movement, the SFP may appear in the center of the camera image.

The distance d between a slave camera system position $\vec{c}$ and SFP $\vec{x}$ may be computed. Let vector $(a,b,c) = \vec{x} - \vec{c}$. Then d may be computed as $d = \sqrt{a^2 + b^2 + c^2}$.

The zoom of each slave camera system 16 may be controlled to keep the object of interest (a person, for example) substantially the same size in all the images (such as within error margins caused by servoing errors and misalignment), even though the slave camera systems 16 may be different distances away from the object. Let r be the desired radius of a virtual sphere subtending the entire vertical field of view of each image. Let $d_i$ be the distance from slave camera system $16_i$ to the SFP. The desired vertical field of view angle $\alpha_i$ can be computed as $\alpha_i = 2*\arctan(r/d_i)$. The zoom parameter that achieves this desired field of view is then computed by the servo control module $44_i$ from data collected during the prior zoom camera calibration procedure.

The focus of each slave camera system 16 may be controlled to achieve sharp focus at the SFP. The focus parameter that achieves sharp focus at distance $d_i$ may be computed for slave camera system $16_i$ using the distance versus focus parameters equations or tables derived from the prior focus camera calibration procedure.

According to another embodiment, in order to achieve smooth motion, each servo control module 44 of the slave camera control units 26 may have to command the pan/tilt device 20 of the slave camera systems 16 as well as the camera/lens systems thereof at an even higher rate than it is receiving commands from the slave control module 43 of the master control unit. This may be achieved by interpolating between the last-received command and the current command, thereby controlling the pan, tilt, zoom and focus in smaller increments, more frequently.

Although the present invention has been described herein with respect to certain embodiments, those of ordinary skill in the art will recognize that many modifications and variations of the present invention may be implemented. For example, rather than employing a distributed architecture, the master control unit 24 and the slave camera control units 26 may be integrated into one computer device. According to such an embodiment, the master control unit 24 may therefore further include a servo control module 44 for computing the PTZF commands for each slave camera system 16.

According to one embodiment, the video image sequence generator 60 may be integrated with the computing device of the master control unit 24, as may the remote operator interface unit 80 or the computer vision control unit 84. In addition, according to another embodiment, the slave control module 43 may be distributed among the slave camera control units 26. According to such an embodiment, the appropriate master/slave mapping data may be stored in a memory unit of the slave camera control units 26.

According to another embodiment, one may chose to make one of the slave camera systems 16 the master camera. Accordingly, the original master camera system 14 would then be under the control of one of the slave camera control units 26. This may be realized, for example, by connecting each of the camera systems 14, 16 to a network such that each camera system 14, 16 is in communication with the master control unit 24 and at least one slave camera control unit 26.

According to another embodiment, the system 10 may include a plurality of master camera systems 14, each one controlling a subset of the slave camera systems 16. According to such an embodiment, the system 10 may include a plurality of master control units 24, one for each master camera system 14. According to one embodiment, each of the master control units 24 may be centralized in one computing device, thereby essentially implementing a system 10 with only one master control unit 24 in communication with each of the master camera systems 14.

The foregoing description and the following claims are intended to cover all such modifications and variations.

What is claimed is:

1. A system for servoing on a moving target within a dynamic scene, comprising:
    a master variable pointing camera system;
    a plurality of slave variable pointing camera systems, wherein the slave variable pointing camera systems and the master variable pointing camera system are positioned around the scene;
    a master control unit in communication with the master variable pointing camera system for determining, based on parameters of the master variable pointing camera system and mapping data between the master variable pointing camera system and the slave variable pointing camera systems, parameters for each of the slave variable pointing camera systems such that, at a point in time, the master variable pointing camera system and the slave variable pointing camera systems are aimed at the target and a size of the target in an image from each of the master variable pointing camera system and the slave variable pointing camera systems is substantially the same; and
    a plurality of slave camera control units in communication with the master control unit, wherein each slave camera control unit is for controlling at least one of the slave variable pointing camera systems based on the parameters for each of the slave variable pointing camera systems,
    wherein the mapping data includes:
        data regarding the geometric relationship of the camera systems to the scene;
        data regarding the relationship between the zoom and the angular field of view for each camera system; and
        data regarding the relationship between the focus and the depth of field for each camera system.

2. The system of claim 1, wherein the parameters of the master variable pointing camera system and the parameters for the slave variable pointing camera systems include pointing parameters and optical parameters.

3. The system of claim 2, wherein:
the master variable pointing camera system includes a master pan/tilt camera system; and
the plurality of slave variable pointing cameras includes a plurality of slave pan/tilt camera systems.

4. The system of claim 3, wherein the wherein the parameters of the master variable pointing camera system and the parameters for the slave variable pointing camera systems include pan, tilt, zoom and focus parameters.

5. The system of claim 2, further comprising a video image sequence generator in communication with the master control unit and the slave camera control units.

6. The system of claim 5, wherein the video image sequence generator is for generating a video image sequence of the target by outputting an image from certain of the master variable pointing camera system and the slave variable pointing camera systems in sequence according to the position of the master variable pointing camera system and the slave variable pointing camera systems around the scene.

7. The system of claim 5, further comprising a computer vision control unit in communication with the master control unit and the master variable pointing camera system.

8. The system of claim 5, further comprising a remote operator interface unit in communication with the master control unit and the master variable pointing camera system.

9. The system of claim 5, wherein the master control unit includes:
a target determination module for determining a position of the target within the scene and a size of the target at the position in an image from the master variable pointing camera system based on the parameters of the master variable pointing camera system; and
a slave control module in communication with the target determination module for determining the parameters for each of the slave variable pointing camera systems based on the position of the target and the size of the target in the image from the master variable pointing camera system.

10. The system of claim 6, wherein the image sequence generator is for outputting images from each of the master variable pointing camera system and the slave variable pointing camera systems according to their position around the scene, wherein the images are from a common point in time so as to generate a 3 D stop-motion video image sequence.

11. A method for servoing on a moving target within a dynamic scene, comprising:
reading parameters of a first variable pointing camera system;
determining parameters for a plurality of other variable pointing camera systems based on the parameters of the first variable pointing camera system and mapping data for the camera systems, wherein the first variable pointing camera system and the plurality of other variable pointing camera systems are positioned around the scene, such that, at a point in time, each of the variable pointing camera systems is aimed at the target and a size of the target in an image from each of the variable pointing camera systems is substantially the same; and
controlling the plurality of other variable pointing camera systems based on the parameters for the plurality of other variable pointing camera systems
wherein the mapping data includes:
data regarding the geometric relationship of the camera systems to the scene;
data regarding the relationship between the zoom and the angular field of view for each camera system; and
data regarding the relationship between the focus and the depth of field for each camera system.

12. The method of claim 11, wherein:
reading parameters of the first variable pointing camera system includes reading mechanical and optical parameters of the first variable pointing camera system; and
determining parameters for the plurality of other variable pointing camera systems includes determining mechanical and optical parameters for the plurality of other variable pointing camera systems.

13. The method of claim 12, wherein the first variable pointing camera system includes a first pan/tilt camera system, wherein the plurality of other variable pointing camera systems include a plurality of other pan/tilt camera systems, and wherein:
reading parameters of the first pan/tilt camera system includes reading pan, tilt, zoom and focus parameters of the first pan/tilt camera system; and
determining parameters for the plurality of other pan/tilt camera systems includes determining pan, tilt, zoom and focus parameters for the plurality of other pan/tilt camera systems.

14. The method of claim 11, further comprising:
storing digitized, time-stamped images from the variable pointing camera systems; and
generating a video image sequence of the target by outputting an image from certain of the variable pointing camera systems in sequence according to the position of the variable pointing camera systems around the scene.

15. The method of claim 11, wherein determining parameters for the plurality of other variable pointing camera systems includes:
determining a position of the target within the scene and a size of the target at the position in an image from the first variable pointing camera system based on the parameters of the first variable pointing camera system; and
determining the parameters for each of the other variable pointing camera systems based on the position of the target and the size of the target in the image from the first variable pointing camera system.

16. The method of claim 11, further comprising selecting one of the other variable pointing camera systems to be the first variable pointing camera system.

17. The method of claim 14, wherein generating the video image sequence includes generating a 3 D stop-motion video image sequence of the target by outputting images from each of the variable pointing camera systems according to their position around the scene, wherein the images are from a common point in time.

18. A system for servoing on a moving target within a dynamic scene, comprising:
a plurality of master variable pointing camera systems;
a plurality of slave variable pointing camera systems, wherein the slave variable pointing camera systems and the master variable pointing camera systems are positioned around the scene;
at least one master control unit in communication with each of the master variable pointing camera systems for determining, based on parameters of the master variable pointing camera systems and mapping data for the camera systems, parameters for certain of the plurality of the slave variable pointing camera systems such that, at a point in time, each of the master variable pointing camera systems and the slave variable pointing camera systems are aimed at the target and a size of the target in an image from each of the master variable pointing camera systems and the slave variable pointing camera systems is substantially the same; and a plurality of slave camera control units, each slave camera control unit in communication with at least one of the master control units, wherein each slave camera control unit is for controlling at least one of the slave variable pointing camera systems based on the parameters for each of the slave variable pointing camera systems, wherein the mapping data includes:

data regarding the geometric relationship of the camera systems to the scene;

data regarding the relationship between the zoom and the angular field of view for each camera system; and data regarding the relationship between the focus and the depth of field for each camera system.

19. The system of claim 18, wherein the at least one master control unit includes a plurality of master control units, and wherein each of the master control units is in communication with at least one master variable pointing camera system and is for determining, based on parameters of the master variable pointing camera systems, parameters for certain of the plurality of the slave variable pointing camera systems such that, at a point in time, each of the master variable pointing camera systems and the slave variable pointing camera systems are aimed at the target and a size of the target in an image from each of the master variable pointing camera systems and the slave variable pointing camera systems is substantially the same.

* * * * *